Feb. 4, 1969  W. J. EAKINS  3,425,862
METHOD OF MAKING POLYMER COATED INORGANIC FILAMENTARY MATERIALS
Filed Jan. 20, 1966
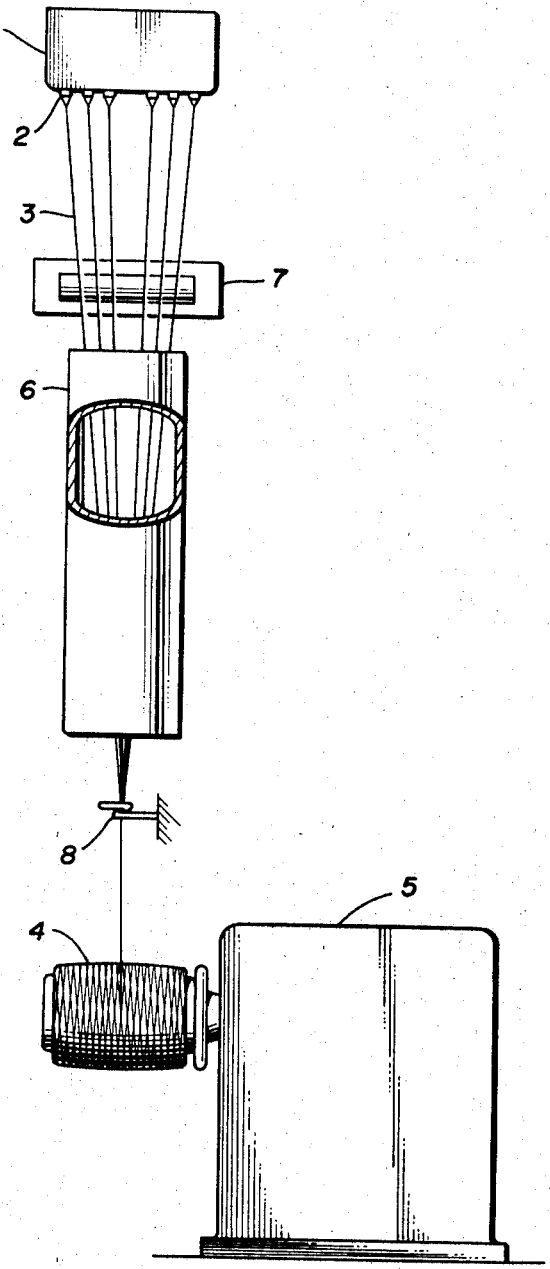
INVENTOR.
WILLIAM J. EAKINS
BY John T. Miller
ATTORNEY

United States Patent Office 3,425,862
Patented Feb. 4, 1969

3,425,862
METHOD OF MAKING POLYMER COATED INORGANIC FILAMENTARY MATERIALS
William J. Eakins, Wilbraham, Mass., assignor, by mesne assignments, to Monsanto Company, St. Louis, Mo., a corporation of Delaware
Filed Jan. 20, 1966, Ser. No. 521,940
U.S. Cl. 117—126        7 Claims
Int. Cl. C03c 25/02

ABSTRACT OF THE DISCLOSURE

Strands formed from continuous glass filaments each of which is individually coated over its entire surface with a thermoplastic resin are characterized in having freedom of movement among the individual filaments thereof along substantially their entire length, thereby reducing the tendency of the strand filaments to fracture easily when the strand is subjected to repeated flexing. Strands of this character are particularly useful in the formation of fabrics and laminates.

---

The present invention relates to thermoplastic resin coated continuous inorganic filamentary materials and to the methods of preparing and using such filamentary materials. More particularly the invention relates to a continuous glass filament having a thermoplastic resin coating thereon. The invention also relates to a strand containing a plurality of thermoplastic resin coated continuous glass filaments. In addition, the invention encompasses methods for producing the thermoplastic resin coated continuous filamentary materials as well as to the methods for employing these filamentary materials in the formation of fabrics and laminates.

The formation of fibers of glass is normally by means of a high-speed attenuation of molten glass. In commercial processes the molten glass is continuously flowed through a plurality of orifices and concurrently attenuated to form continuous glass filaments. These continuous glass filaments are then wound onto a package by means of a high-speed rotary winder positioned in close proximity to the fiber-forming apparatus. The formation and winding take-up of the filaments is a high-speed operation and is normally conducted at speeds in the neighborhood of about 3,000 feet per minute to about 10,000 feet per minute.

The nature of glass filaments makes them subject to abrasion and limited flexibility. Also, unprotected surfaces of glass filaments are subject to deterioration upon contact with the atmosphere at the high temperatures used in drawing of the fibers. In commercially employed techniques, in order to avoid these inherent problems, the glass filaments, subsequent to drawing, are passed through an emulsion containing ingredients designed to impart various properties to the dried coating. In the absence of the application of such a protective coating, the individual fibers and strands or yarns formed therefrom are reduced in value through attrition resulting from mutual abrasion occurring during the basic processing of the glass fibers such as winding, twisting and strand formation. A coupling agent is often employed in conjunction with the coating to bond the said coating to the surface of the glass fiber. A film-forming ingredient is utilized to protect the glass surface against rubbing and to individually bond the filaments together and prevent inter-filamentary movement. After application, the filaments are wound onto a hollow tube mounted on a spinning drum. When a sufficiently large package has been formed, it is removed and stacked with other packages in ovens for drying. Drying takes place at temperatures of about 240–270° F. for periods of time in the neighborhood of 8 hours. The coating solution usually 5–10% solids dries to a coating of about 0.8–2% by weight of the glass filament.

It is well known that there are drawbacks to the presently employed commercial methods. One important drawback is that the commercial sizes now in use immobilize the filaments in a strand in relationship to each other rather than furnish a fully protective coating to the individual filaments of the strand. This is true since the drying takes place after the filaments are brought together in a strand thus permitting frequent bridging of the size between the filaments. In view of this, flexibility of the strand is reduced and the individual filaments of the yarn tend to fracture easily when subjected to repeated flexing.

It is therefore desirable to produce an individual, continuous glass filament coated over the entire surface thereof with a thermoplastic resin coating.

It is an object of the present invention to provide methods for producing a continuous glass filament coated with a thermoplastic resin as well as methods for producing strands consisting of a plurality of the continuous resin coated glass filaments.

It is further an object of the present invention to provide a method for employing glass strands consisting of such resin coated continuous glass filaments.

A still further object is to provide a yarn having relatively larger diameter fibers that when woven in a fabric can be used in clothing and coverings for house furnishings and the like.

Additional objects will be apparent from a consideration of the present description of the instant invention.

The objects of the present invention are accomplished and the desired glass filamentary materials provided by an integrated process employing the steps of forming the glass filaments, applying as a coating over the entire surface of the glass filament a glass-resin coupling agent and a solution comprising an inert solvent solution of a thermoplastic resin, passing the thus coated filaments through a heating zone wherein conditions are maintained to evaporate the solvent from the coating and bond the resin to the filament surface through the glass-resin coupling agent to form a non-tacky coated glass filament and subsequently taking up the thus coated non-tacky continuous glass filaments.

The method of the present invention is best described by reference to the drawing which depicts a schematic representation of a conventional apparatus employed in the formation coating and packaging of glass fibers according to the method of the present invention.

Referring now to the drawing, the glass fibers are formed from molten glass contained within the container means 1 by flowing through an orifice contained in the bushing tip 2. As the glass flows through these orifices it is formed into filaments 3 which are attenuated and taken up onto a package 4 by a take-up means 5 which is positioned beneath the glass filament forming portion of the apparatus. The apparatus employed in the formation of the glass filaments from the molten glass materials may be that which is commonly employed in the art and is well known to those skilled in the art. The take-up means employed for attenuating the filament and forming the desired package may be any means suitable for forming the desired package. These take-up means are likewise well known to those persons skilled in the art.

The drawing illustrates the simultaneous and continuous formation and coating of six filaments, however, it is to be understood that any number of glass filaments from one to as many as 100 and above may be produced according to the present invention and depending upon the fiber-forming means employed. It is to be understood that in the formation of a plurality of glass filaments the desired coating is to be applied to each individual filament and the individual filaments are desirably maintained under conditions preventing inter-filamentary contact prior to the achieving of a non-tacky coating on each of the individual glass filaments. After achieving the non-tacky coating on the individual filaments the filaments will be brought together into a strand formation bu use of a guide means. The guide means may take any form suitable for bringing the individual filaments together into a strand.

As the glass material passes through the small orifices in the bushing tips 2 and the filaments are formed, they are attenuated and drawn through the apparatus. Following the formation of these filaments there is applied to the filaments a coating of the glass-resin coupling agent as well as a solvent solution of the desired thermoplastic resin. The glass-resin coupling agent may be applied to the filament as a separate coating prior to the application of the thermoplastic resin coating, or more preferably, the glass-resin coupling agent may be applied to the fiber in a homogeneous solution with the thermoplastic resin. The drawing illustrates the application of a unitary single coating to the glass filaments. The applicator for the coating is positioned directly beneath the orifices from which the glass fibers are withdrawn. The applicator is indicated on the drawing as 7. The applicator which is employed can take various forms, as for example a vapor phase applicator, padder, and a rotary cylindrical padder. Of special note is a plurality of rotary cylindrical padders each padding a single filament or row of filaments.

It will be readily apparent that the composition of the coating solution applied to the filaments will vary according to the dictates of the ultimately desired products as well as the individual thermoplastic resin and solvent employed. The specific composition of the coating solution employed will, of course, affect the thickness of the thermoplastic resin coating on the ultimately produced continuous glass filament. In general a unitary coating solution will contain from about 3 to about 8% by weight of the thermoplastic resin and most preferably about 5% by weight. The amount of the glass-resin coupling agent employed will vary. However, in general it may be said that the glass-resin coupling agent will be present in an amount of about 1% by weight of the solution. Additional additives may be present in the coating solution if desired and will vary in accordance with the requirements of the final product.

A large number of glass-resin coupling agents can be employed in the present invention. The specific choice will be dictated by the resin system to be used as well as the desired strength of bonding between the surface of the glass filament and the resin necessitated by the specific end use of the coated products. A number of silane and siloxane materials find use as coupling agents, for example vinyl and allyl halo, alkoxy, amino or acyloxy silanes and hydrolysis products and polymers of the hydrolysis products are suitable for use. The precise manner in which the glass-resin coupling agents act to form a bonding between the resin and the surface of the glass filament is not entirely clear. However, it is recognized that the specific resin employed will have a great bearing upon the choice of glass-resin coupling agent employed in view of the fact that the reactive groupings present in the glass-resin coupling agent must be one which is reactive with groups present in the resin employed. Of special mention as a glass-resin coupling agent employed with a vinyl resin, as for example, polyvinylidene chloride is γ-methacryloxy propyl trimethoxy silane. When employing a polycarbonamide resin, as for example polyhexamethylene adipamide, glycidoxy propyl trimethoxy silane finds particular utility.

The amount of the glass-resin coupling agent employed will likewise be dictated by the desired end use of the product. This amount will vary with the particular system being employed. In general, it may be said that the coupling agent is employed in an amount of about 0.05 to 5% by weight of the glass fiber. A preferred range would be an amount of about .25 to 1% by weight of the glass fiber. As previously indicated, glass-resin coupling agent may be applied to the glass filament as a separate coating prior to the application of the solvent system containing the thermoplastic resin or more conveniently it may be applied from a solution containing the thermoplastic resin dissolved in an inert solvent therefor. The drawing illustrates the employment of a single solvent system containing the glass-resin coupling agent.

Conveniently the coating solution is prepared by combining the thermoplastic resin, the glass-resin coupling agent and the desired inert solvent as well as other desired additives to form a homogeneous solution. This homogeneous solution is fed to the applicator means and applied to the individual glass filaments in the manner of the present invention.

By inert solvent is means an organic or inorganic composition which is a solvent medium for the thermoplastic resin which is employed and which is not detrimental to the desired properties of the glass filamentary product or to the resin coating. The particular choice of inert solvent will be influenced by the particular resin which is employed. A solvent must be selected which will be susceptible to flashing off substantially completely in the heating zone in order to leave a non-tacky resin coated glass filament. In this regard a solvent with a relatively high vapor pressure should be selected. Of special note with regard to a vinyl resin, as for example, polyvinylidene chloride, are dioxane and tetrahydrofuran. As a solvent to be employed in connection with a polycarbonamide such as polyhexamethylene adipamide there may be mentioned chloral hydrate ($CCl_3CH(OH)_2$) either alone or as an alcohol solution.

As previously indicated, additional additives may be present in the coating solution applied to the continuous glass filaments. These additional addiments may be those which confer upon the coating of the glass filament per se desirable properties. In this regard there may be mentioned such additives as light stabilizers for the resin as well as pigments to provide desired coloring effects.

The amount of the coating solution applied to the individual filaments will vary in accordance with the desired properties of the ultimately produced product. This amount will likewise vary with the specific composition employed as the coating solution as well as the particular elements present in the composition; i.e., the specific resin and glass-resin coupling agent employed. In general the amount applied to the individual filaments should be such that the ultimate thermoplastic resin coating on the individual continuous glass filaments is from about 2% to about 5% by weight of the glass filaments.

As has been previously indicated, following the application of the coating solution the coated filaments are passed through a heating chamber 6 for the purpose of evaporating the solvent from the coating solution to produce a firm bond between the surface of the glass filament and the thermoplastic resin through the glass-resin coupling agent and to render the thermoplastic resin coating non-tacky. In the case of a plurality of filaments the filaments will subsequently be combined into a single strand. If such combining or collecting occurs while the coating is tacky an adhering together of the individual filaments at the point of contact will occur. This will, in many cases, be detrimental to the flexible nature of the strand produced and will thus be avoided. In some cases, however, it may be desirable to achieve contact between the coated filaments while the coating is still somewhat tacky in order to form a strand in which the individual filaments are bonded together at certain points along the periphery of the said strand. In this manner a strand is formed in which the individual filaments have less tendency to separate or stray from the strand. This may be of special importance in later manufacturing operations utilizing the thus formed strand.

The desired separation of the filaments during the forming of the non-tacky coating may be maintained by utilizing a proper tension in taking up the fibers and by maintaining the proper conditions in the forming and heating chambers of the apparatus. This heated zone is indicated on the drawings as 6. In the heated zone the solvent is flashed off from the coated glass filament and a high degree of bonding is achieved between the surface of the glass filament and the thermoplastic resin by means of the glass-resin coupling agent. Conditions are maintained in the heated zone such that a non-tacky coated filamentary material is obtained at the exit end of the heated zone. The heated zone may conveniently take the form of a cylindrical chamber isolated from the atmosphere and maintained under conditions of temperature and pressure which are sufficiently regulated to achieve a non-tacky coating of the thermoplastic resin on the glass filament.

In many cases it will prove desirable to maintain the temperature at the entrance end of the heating chamber higher than that at the exit end of the chamber. The temperature employed in the heating chamber will be dependent upon the particular coating to be applied to the filamentary material as well as the length of the heating chamber. Temperatures as high as about 800° F. can be employed depending upon the particular resin system employed. The temperature employed will also vary with the speed of the filament through the heating chamber. In one specific aspect of the present invention utilizing polyvinylidene chloride as the thermoplastic resin and with a filament speed of about 3,000 feet per minute it was found that in a heating chamber about 6 feet in length, a temperature of 350° F. was desirable at the entry end and a temperature of about 250° F. at the exit end of the heating chamber.

As the non-tacky coated filaments are withdrawn from the heating chamber they are collected and formed into a strand by means well known to the art. This means may take the form of a guide member such as a grooved wheel or it may be a guide eye or similar conventional collecting means. Of specific note in regard to the collecting means is a graphite guide. In the drawing the guide means is indicated as 8. Following the collection of the filaments into a strand, the strand, or in the case of the single filament, the individual filament, may be taken up by means suitable to form the desirable package.

A large number of thermoplastic resinous materials or mixtures thereof are suitable for utilization in the present invention. One of the factors in determining the proper thermoplastic resinous material employed will, of course, be the ability of the material to form a non-tacky coating on the filament within the short period of time between the application to the filament of the solution containing the resin and the taking up of the filaments. It will be recognized that the filaments are formed and move through the processing apparatus in a relatively short period of time. A rate of filament movement in the nature of about 4500 feet per minute might be considered normal. However, a rate of movement in the nature of 10,000 feet per minute would not be considered excessive. An additional factor to be considered in selecting the thermoplastic resin to be employed will be the strength of a rather fine coating of the resin especially in withstanding repeated flexing; and its ability to prevent damage to the glass filament itself. As examples of resins to be employed there may be mentioned vinyl resins as for example polyvinylidene chloride. Also, there may be mentioned the class of polycarbonamide or nylon resins. As a specific illustration of this type of thermoplastic resin there may be mentioned polyhexamethylene adipamide which is known to the art as nylon-66. It will be well within the skill of the routineer in the art to select numerous additional thermoplastic resins for filling the requirements for use in the instant invention. One further factor to be mentioned with regard to the thermoplastic resin to be employed is that the resin used will depend to a great extent upon the specific solvent system employed. As will be apparent to those skilled in the art from the foregoing description of the invention, it is imperative in the present invention that a resin be employed which will form a non-tacky coating on the continuous glass filaments within the period of time used for processing the individual glass filaments. In some cases a specific solvent will be susceptible to flashing off from one thermoplastic resin but not from another. For this reason care must be utilized in selecting the proper resin solvent system to be employed. However, the routineer in the art will be able to select various resin-solvent systems susceptible for utilization.

In one particular aspect, the present invention relates to employing a specific applicator means wherein the surrounding atmosphere is controlled. In this regard, it will be recognized that the coating system employs a solvent medium for the thermoplastic resins having a relatively high vapor pressure. In view of this it has been found that considerable evaporation of the solvent may occur at the point of application of the coating solution to the continuous glass filament. This is especially true where the heat of the filament is transferred to the applicator means and thus to the coating solution. This high rate of evaporation of the solvent has a tendency to change the composition of the coating solution and thus alter the uniformity of the coating applied to the individual glass filaments. In overcoming this problem it has been found that an applicator means can be employed in which the atmosphere immediately surrounding the applicator itself is controlled as for example by enclosing the applicator means and saturating the atmosphere with the specific solvent vapor to prevent solvent evaporation. Other means for preventing the evaporation of the solvent from the coating solution will be apparent to those skilled in the art.

The coated glass filamentary materials of the present invention find utility in the production of a considerable number of highly desirable products. Yarn formed of a plurality of the coated continuous filaments may be easily woven into fabrics by methods which are well known in the textile industry and which are presently in use. The thus produced fabrics can be used as such or they can additionally be utilized in preparing laminates useful for industrial as well as home usage.

In forming laminates, the fabric can be treated with additional polymer in a solvent so that the amount of polymer present is from about 30 to about 50 percent by weight of the glass. The plies of this polymer enriched fabric, the solvent having been evaporated as for example in a circulating air oven, may then be placed together to form a multi-layer sandwich and the sandwich then subjected to pressure to heat-soften the plastic. Any entrapped air is pushed out and the mass is compressed into a solid thermoplastic laminate. Such laminates find considerable use in the industrial environment. For example a thin laminate prepared from a fabric woven from polyvinylidene chloride treated glass employing a polyvinylidene chloride as a bonding resin forms a serviceable coated covering for use in covering chairs and sofas as well as automobile seats. The resistance to water of such a laminate is excellent. Further, a thin laminate of nylon-66 treated glass woven into a fabric using nylon-12 as a bonding resin is typical of another formulation which can be utilized to form a covering fabric.

The yarn may additionally be used to make laminates by the filament winding technique. In this method the yarn having little or no twist is treated with a compatible polymer in a solvent to increase the polymer content to about 30 to 40 percent by weight polymer. The solvent is then flashed off and the strand wound at near the polymer softening point on the mandrel. This technique offers a way for producing a non-woven coated fabric. If strength in the X and Y directions of a plane is desired, the first layer may be wound at a different angle to the axis of the mandrel than is the second layer.

It is also possible that belt drives for machinery and conveyor belts for moving packages or even conveyor belts for carrying people may be fabricated of laminates prepared from this glass filament strand and coated with a compatible and flexible polymer.

One extremely important value of utilizing materials provided by the instant invention over that using a conventional sized strand in a like manner is that each individual filament is covered with a polymer that is well bonded to the glass filament surface and the polymer acting as the bonding resin completely wets each of the treated filaments over its entire surface and any trapped air is released to thus form a void free laminate.

Having described the generic aspects of the present invention, the following specific embodiment is given to illustrate the specific aspects of the invention. The specific example is merely illustrative and is not to be taken as limiting the invention.

EXAMPLE

In the present example an apparatus of the type illustrated in the drawing is employed.

A homogeneous coating solution is prepared employing dioxane as a solvent. The solution is prepared to contain 5% by weight polyvinylidene chloride, 1% by weight γ-methacryloxy propyl trimethoxy silane and about 2.5% by weight of a lemon yellow pigment (Drakenfeld's No. 10106 lemon yellow). The coating solution is fed to a number of rotary cylindrical padders each padding a single row of separate filaments. A plurality of filaments are drawn from the bushing 2 in contact with the rotary cylindrical padders indicated on the drawing as 7. The amount of the coating solution applied to the individual filaments is about 3% by weight of the filament. The coated filaments are then passed through a tubular heating zone 6. The heating zone is approximately 6 feet in length and the temperature at the entry end of the zone is approximately 350° F. and the exit temperature is approximately 250° F. The filaments pass through the heating zone at a rate of about 3,000 feet per minute. The filaments possess a non-tacky polyvinylidene chloride resin coating at the exit end of the heating chamber and are collected at a graphite guide into a strand. The strand is taken up on a cylindrical mandrel 4 turning at a constant speed. Examination of the individual coated filaments indicates an increase in weight of about 3% which represents an actual surface thickness of the resin of about 0.1 micron.

The filaments thus coated demonstrate remarkable resistance to abrasion when dry. The strand of filaments demonstrates increased strength and resistance to abrasion and greatly increased flexibility to turn at reduced diameters when compared to a conventionally sized strand.

A fabric woven from a yarn prepared as previously described can be laminated in the manner described below.

The fabric is treated with a solvent solution of polyvinylidene chloride and the solvent evaporated as for example in a circulating air oven at a temperature of about 250–300° F. The amount of additional polymer applied is sufficient to increase the polymer present to about 30–50% by weight of the glass. The plies of polymer enriched fabric are then placed together to form a multi-layer sandwich. The lay-up is subjected to pressure on the broad faces while being heated to soften the plastic. The mass is compressed and the entrapped air pushed out to thus form a solid void-free thermoplastic laminate. Such a laminate finds use as previously indicated herein.

It is apparent that various changes can be made in the compositions and methods and products of the present invention without departing from the spirit of the invention. As previously indicated the example set forth is purely illustrative and is not to be taken as limitative of the invention.

I claim:
1. A method for the production of a strand composed of a plurality of continuous glass filaments, wherein each of said filaments has intimately bonded to the surface thereof a flexible thermoplastic resin, which comprises:
    (a) drawing a plurality of glass streams through orifices to form individual glass filaments,
    (b) moving the filaments away from the orifices at a high rate of speed while preventing contact between the filaments,
    (c) applying to each of the filaments while still preventing contact between the filaments a coating of a glass-resin coupling agent and a solution comprising a thermoplastic resin in an inert solvent therefor,
    (d) passing the coated filaments through a heated zone under conditions sufficient to place the coated filaments in a non-tacky state while preventing contact between the coated filaments while in a tacky state,
    (e) combining the non-tacky coated filaments into a strand, and
    (f) taking up the said strand.

2. A method as in claim 1 wherein there is employed a single coating solution comprising a glass-resin coupling agent, a thermoplastic resin and an inert solvent therefor.

3. A method as in claim 1 wherein the thermoplastic resin is a vinyl resin.

4. A method as in claim 2 wherein the coating solution contains from about 3 to about 8% by weight of the resin and about 1% by weight of the glass-resin coupling agent.

5. A method as in claim 4 wherein polyvinylidene chloride is employed as the resin, γ-methacryloxy propyl trimethoxy silane is employed as the glass-resin coupling agent, and tetrahydrofuran is employed as the solvent.

6. A strand made by the process of claim 1.

7. A method for the production of a strand composed of a plurality of continuous glass filaments, wherein each of said filaments has intimately bonded to the surface thereof a flexible thermoplastic resin which comprises:
    (a) drawing a plurality of glass streams through orifices to form glass filaments,
    (b) moving away the filaments from the orifices at a high rate of speed while preventing contact between the filaments,
    (c) applying to each of the individual filaments while preventing contact between the said filaments a coating of a solution comprising polyvinylidene chloride, γ-methacryloxy propyl trimethoxy silane and dioxane, the polyvinylidene chloride and γ-methacryloxy propyl trimethoxy silane being present in amounts of about 5% and 1% by weight of the solution respectively,
    (d) passing the coated filaments at a rate of about 3,000 feet per minute through a heated chamber about 6 feet in length, the temperature in the chamber being about 350° F. at the entrance end and about 250° F. at the exit end while preventing contact between the coated filaments while in a tacky state, (e) collecting the non-tacky coated filaments through a graphite guide to form a strand, and
(f) taking up the strand at a constant speed.

References Cited

UNITED STATES PATENTS

| | | | |
|---|---|---|---|
| 2,767,519 | 10/1956 | Bjorksten | 65—3 |
| 2,880,552 | 4/1959 | Whitehurst | 63—3 |
| 2,881,732 | 4/1959 | Chrystman. | |
| 3,168,389 | 2/1965 | Eilerman | 65—3 |
| 3,249,411 | 5/1966 | McWilliams et al. | 65—3 |
| 3,278,329 | 10/1966 | Wiczer. | |

DONALL H. SYLVESTER, *Primary Examiner.*

ROBERT L. LINDSAY, *Assistant Examiner.*

U.S. Cl. X.R.

65—3; 161—170